Feb. 28, 1928.

G. MAESTRO 1,661,076

CHEESE GRATING MACHINE

Filed Oct. 8, 1926

Inventor
Giovanni Maestro,

By

Attorney

Patented Feb. 28, 1928.

1,661,076

UNITED STATES PATENT OFFICE.

GIOVANNI MAESTRO, OF NEW KENSINGTON, PENNSYLVANIA.

CHEESE-GRATING MACHINE.

Application filed October 8, 1926. Serial No. 140,390.

This invention relates to a cheese grating machine.

An object of the present invention is to improve the construction of cheese grating machines, and to provide a simple, practical and efficient cheese grating machine of strong, durable, and comparatively inexpensive construction adapted to enable cheese and other material to be easily grated and to be discharged into a dish or other receptacle supported within the machine so that there will be no liability of the grated material being wasted or unnecessarily handled in transferring it to the receptacle designed to receive the grated material.

A further object of the invention is to provide a cheese grating machine of this character adapted to be readily secured in position on a table, bracket or other suitable support, and adapted to permit a dish or other receptacle to be readily placed in and removed from the machine.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

Figure 1:
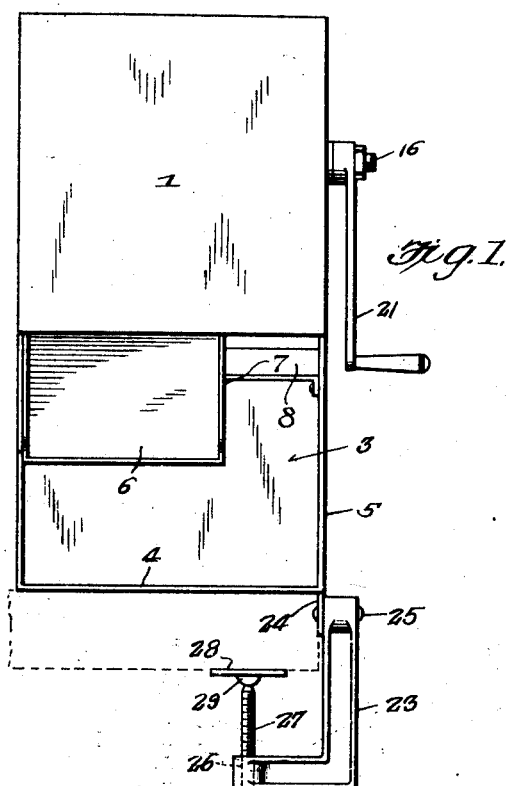
Figure 1 is an elevation of a cheese grating machine constructed in accordance with the present invention.
Figure 2:
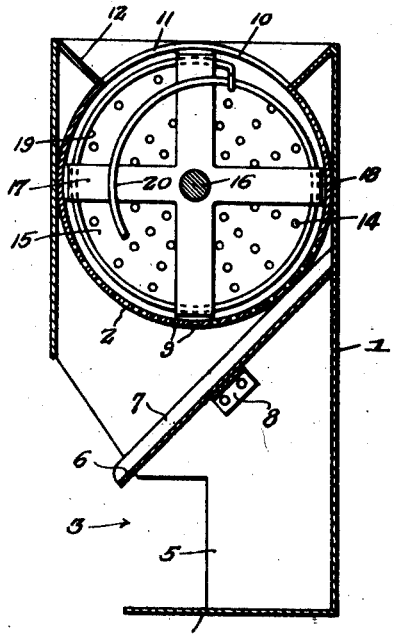
Fig. 2 is a vertical sectional view taken transversely of the inner cylindrical casing.
Figure 3:
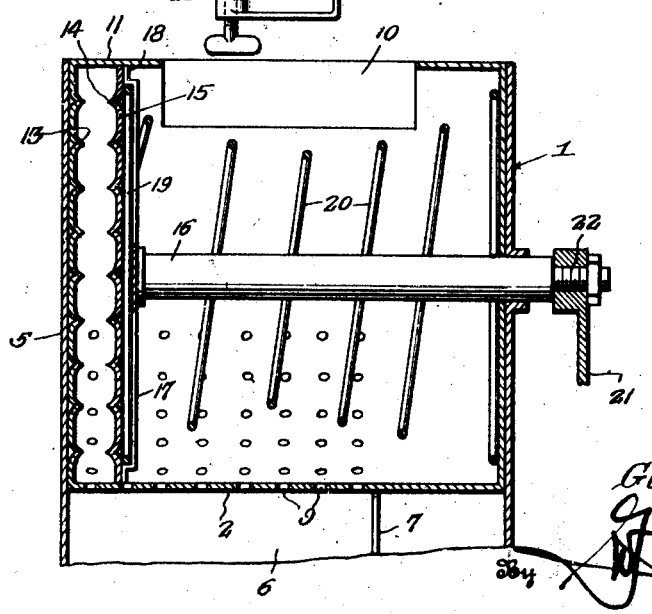
Fig. 3 is a vertical sectional view taken longitudinally of the inner cylindrical casing.

In the accompanying drawings, in which is illustrated the preferred embodiment of the invention, the cheese grating machine comprises in its construction an outer vertical casing 1 designed to be constructed of aluminum or other suitable metal and open at the top and having mounted within its upper portion an inner horizontal cylindrical casing 2. The outer casing is open at the lower front portion at 3 and is provided with a horizontal bottom 4. The side 5 of the vertical casing is cut away as shown to provide ready access to an inclined chute 6 located at the cut away portion of the side 5, which is arranged at the left hand side of the machine in Fig. 1 of the drawing.

The chute, which is constructed of sheet metal or other suitable material, is inclined and is provided at its sides with flanges 7 forming walls for retaining the material on the chute. The chute is shown supported by an approximately U-shaped bracket 8 composed of spaced parallel arms and a connecting portion, the arms being secured to the inner faces of the sides of the vertical casing. The chute is of a width of about one-half of the length of the inner horizontal cylindrical casing, but of course it may be varied in width, as will be readily understood. The cylindrical inner casing is perforated at the bottom and at the lower portions of the sides to form a plurality of outlets 9 for enabling the grated material to be discharged into the chute which is adapted to direct the grated material into a suitable dish or other receptacle supported upon the bottom. The outlets extend from one end of the inner cylindrical casing and terminate short of one end, the inner cylindrical casing being imperforate beyond the chute, so that the grated material is permitted to discharge only at the chute.

The inner horizontal cylindrical casing is provided at the top with an opening 10 which terminates short of the opposite adjacent walls of the outer vertical casing, forming curved flanges 11 which extend across the open upper end of the outer casing from front to rear, and the outer casing is provided at the front and rear of the top opening with beveled faces 12 extending downwardly and inwardly and directing material into the cylindrical inner casing.

The cylindrical inner casing is provided at one end wall with a grating surface 13 with which cooperates a grating surface 14 of a revoluble disk 15 carried by a horizontal shaft 16. The grating surfaces of the end wall and the revoluble disk may be formed in any suitable manner, preferably by forming jagged projecting edges at one face of each of the said parts by perforating such part at the opposite sides thereof in the usual well known manner. The grating faces, however, may be of any other desired construction, and the revoluble disk is secured to radial arms 17 of a spider which is carried by the inner end of the shaft 16. The spider arms 17 have outer bent terminals 18 which fit against the rear face of the revoluble disk and which space the revoluble disk from the body portion of the spider arms to provide an intervening space for the reception of a coil 19 of a spiral spring 20 which is interposed between the revoluble disk and the remote end of the inner cylindrical casing. The spring, which has one of its coils secured in the space between the body portions of the arms and the revoluble disk, bears against the spider and is adapted to exert pressure against the material to produce a positive grinding of the same. The outer end of the shaft is equipped with a suitable crank handle 21 and is preferably threaded at 22 to engage a threaded opening in the adjacent end of the crank handle and the crank handle may be secured on the end of the shaft in any desired manner. In the operation of the cheese grating machine the horizontal shaft is drawn outwardly to separate the contacting grating surface of the revoluble disk from the grating surface of the end wall of the horizontal casing, and the cheese or other material is placed between the two grinding surfaces. The shaft is then rotated while the spring maintains the grinding faces in engagement with the cheese with a pressure sufficient to produce an effective grinding of the same.

The cheese grating machine is equipped at the bottom with a clamp consisting of a substantially vertical pivoted frame member 23 connected at its upper end to a depending flange 24 of the vertical casing by a suitable horizontal pivot 25 and provided at its lower end with a horizontal arm having a vertical opening 26 for the reception of a vertical adjusting screw 27 carrying a jaw 28. The jaw 28 which is connected with the upper end of the screw by a ball and socket joint 29 to enable it to readily adjust itself to the surface to be engaged, is adapted to clamp a table, bracket or other supporting element for enabling the cheese grating machine to be mounted thereon in position for convenient use. The pivot permits of a swinging adjustment of the frame of the clamp, but the clamp may be secured to the outer casing in any other desired manner. The vertical casing is adapted to be placed upon a table or other support and to be moved or adjusted on the same to bring the clamp in position for engaging the lower face of the top of the table or other support and by adjusting the screw the cheese grating machine may be rigidly clamped in position for use.

What I claim is:

1. A grating machine of the class described, comprising an outer vertical casing open at the front at the lower portion and having one of its sides cut away at the said opening, grinding mechanism mounted within the casing above the said opening, and an inclined chute extending downwardly and forwardly in position to receive the grated material and convey it toward said opening, said chute at its outer end being located above the bottom of the casing to provide an intervening space for the reception of a dish or other receptacle on said bottom to receive material from the chute.

2. A grating machine of the class described, comprising an outer vertical casing open at the front at the lower portion and having one of its sides cut away at the said opening, said outer casing being also provided with a horizontal bottom cut away at the front edge at the said opening, grinding mechanism mounted within the casing above the said opening, an inclined chute confined within the casing and located at the cut away portion of the casing and extending downwardly and forwardly toward said opening and arranged in spaced relation with the bottom of the casing, and a supporting bracket extending across the open lower portion of the casing and having terminal arms secured to the casing at opposite sides of the open lower portion, said bracket also extending beneath the chute and supporting the latter.

3. A cheese grating machine of the class described including an outer vertical casing open at the top and provided at the front and rear of the said open top with inclined faces, a horizontal inner cylindrical casing mounted within the outer casing and provided with an opening located at the open top of the vertical casing and terminating short of the ends of the same forming curved top flanges which arch the end portions of the open top of the outer casing from front to rear, said cylindrical casing being provided at one end with a grating face and having a bottom outlet, a horizontal shaft journalled in the outer casing and provided at its inner end with a revoluble grating disk and having operating means at its outer end, and a spring for urging the grating disk towards the grating face of the cylindrical casing.

4. A grating machine of the class described, including an outer casing, an inner horizontal cylindrical casing mounted in the outer casing and provided at the top with an opening terminating short of the opposite ends of the cylindrical casing to provide arched flanges, said cylindrical casing being provided at the bottom with a plurality of perforations forming outlets and extending from one end of the cylindrical casing and terminating short of the other end, the latter end portion of the inner casing being imperforate and the inner casing being provided at the other end with a grating surface, an inclined chute mounted within the outer casing and located beneath the outlets of the inner cylindrical casing, and a horizontal shaft journalled in the outer casing and having a revoluble disk at its inner end arranged to cooperate with the grating surface of the inner casing.

5. A grating machine of the class described including an outer casing, an inner horizontal cylindrical casing provided at the top with an opening terminating short of the ends of the inner casing, said inner casing being provided at one end with a grating surface and having outlet openings at the bottom, a horizontal shaft journalled in the outer casing and provided at the inner end with a spider having arms provided with bent projecting terminals, a revoluble disk secured to the projecting terminals of the spider and having a grating surface, and a coiled spring interposed between the spider and one end of the cylindrical casing and having one of its coils secured between the spider and the disk.

In testimony whereof I have hereunto set my hand.

GIOVANNI MAESTRO.